(12) United States Patent
Sandquist (10) Patent No.: US 9,916,671 B2
(45) Date of Patent: Mar. 13, 2018

(54) SPATIAL VISUALIZATION OF METRICS (71) Applicant: ADOBE SYSTEMS INCORPORATED, San Jose, CA (US)

(72) Inventor: Carl Sandquist, Salt Lake City, UT (US)

(73) Assignee: Adobe Systems Incorporated, San Jose, CA (US)

( * ) Notice: Subject to any disclaimer, the term of this patent is extended or adjusted under 35 U.S.C. 154(b) by 100 days.

(21) Appl. No.: 14/481,548

(22) Filed: Sep. 9, 2014

(65) Prior Publication Data
US 2016/0071296 A1    Mar. 10, 2016

(51) Int. Cl.
*G06T 11/20* (2006.01)
*G06K 9/00* (2006.01)
*G06Q 30/00* (2012.01)

(52) U.S. Cl.
CPC ........ *G06T 11/206* (2013.01); *G06K 9/00476* (2013.01); *G06Q 30/00* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,555,354 A | * | 9/1996 | Strasnick | G06T 17/05 345/427 |
| 5,963,956 A | * | 10/1999 | Smartt | G06F 17/30241 |
| 6,188,403 B1 | * | 2/2001 | Sacerdoti | G06F 17/30554 345/440 |
| 6,782,319 B1 | * | 8/2004 | McDonough | G01C 21/32 701/461 |
| 7,142,210 B2 | * | 11/2006 | Schwuttke | G06T 11/206 345/440 |
| 9,418,341 B1 | * | 8/2016 | Kadarkarai | G06N 99/005 |
| 2003/0063779 A1 | * | 4/2003 | Wrigley | G06Q 30/02 382/116 |
| 2004/0133395 A1 | * | 7/2004 | Ding | G06F 11/3452 702/182 |
| 2005/0192930 A1 | * | 9/2005 | Hightower | G06Q 30/02 |
| 2011/0205231 A1 | * | 8/2011 | Hartley | G06T 11/206 345/440 |
| 2011/0283231 A1 | * | 11/2011 | Richstein | G06F 3/0488 715/810 |
| 2012/0054653 A1 | * | 3/2012 | Grossman | 715/764 |
| 2014/0055490 A1 | * | 2/2014 | Mule | G06T 11/80 345/633 |
| 2014/0104291 A1 | | 4/2014 | Rutz | |

(Continued)

*Primary Examiner* — M Good Johnson
(74) *Attorney, Agent, or Firm* — Shook, Hardy & Bacon L.L.P.

(57) ABSTRACT

Computer-readable media, computer systems, and computing devices for method of providing spatial visualizations of metrics. In embodiments, the method includes referencing a spatial map having multiple spatial regions. A set of metric stacks is also referenced. The metric stacks graphically indicate values associated with multiple metrics. Further, each metric stack corresponds with one of the spatial regions based on location with which the values associated with the multiple metrics correspond. The metric stacks are overlaid on the corresponding spatial region within the spatial map such that a user can simultaneously view metrics associated with particular spatial regions.

20 Claims, 8 Drawing Sheets

(56) References Cited

U.S. PATENT DOCUMENTS

2014/0325366 A1* 10/2014 Dunphey ............... G06Q 10/10
  715/738
2014/0354648 A1* 12/2014 Bak ...................... G06T 11/206
  345/440
2016/0034648 A1* 2/2016 Mohlenbrock ..... G06F 19/3443
  705/3
2016/0065425 A1* 3/2016 Poe ...................... H04L 43/045
  709/224

* cited by examiner

SPATIAL VISUALIZATION OF METRICS

BACKGROUND

Data associated with a geographical region can generally be displayed in a format in which such data overlays a corresponding area of a geographical display. For example, a heat map can be presented to illustrate occupancy data of individuals within a geographical region. Displays of data overlaying a corresponding geographical space, however, are frequently limited to a single dimension or metric of data.

SUMMARY

Embodiments of the present invention are directed to generating and providing spatial visualization of metrics. In this regard, a user may simultaneously view multiple metrics associated with a particular spatial region or set of spatial regions within a spatial map, such as a geographical map. Simultaneous visualization of metrics enables a user to efficiently assess metrics in relation to a space. Further, in accordance with embodiments described herein, a user can interact with the spatial visualization of metrics to control the information being viewed by the user. For instance, a user might select a metric or set of metrics for which data is desired to be viewed, a spatial map indicating a spatial area of interest to the user, a size of spatial regions within the spatial map, or the like.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The present invention is described in detail below with reference to the attached drawing figures, wherein.

DETAILED DESCRIPTION

The subject matter of the present invention is described with specificity herein to meet statutory requirements. However, the description itself is not intended to limit the scope of this patent. Rather, the inventor has contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Figure 2:
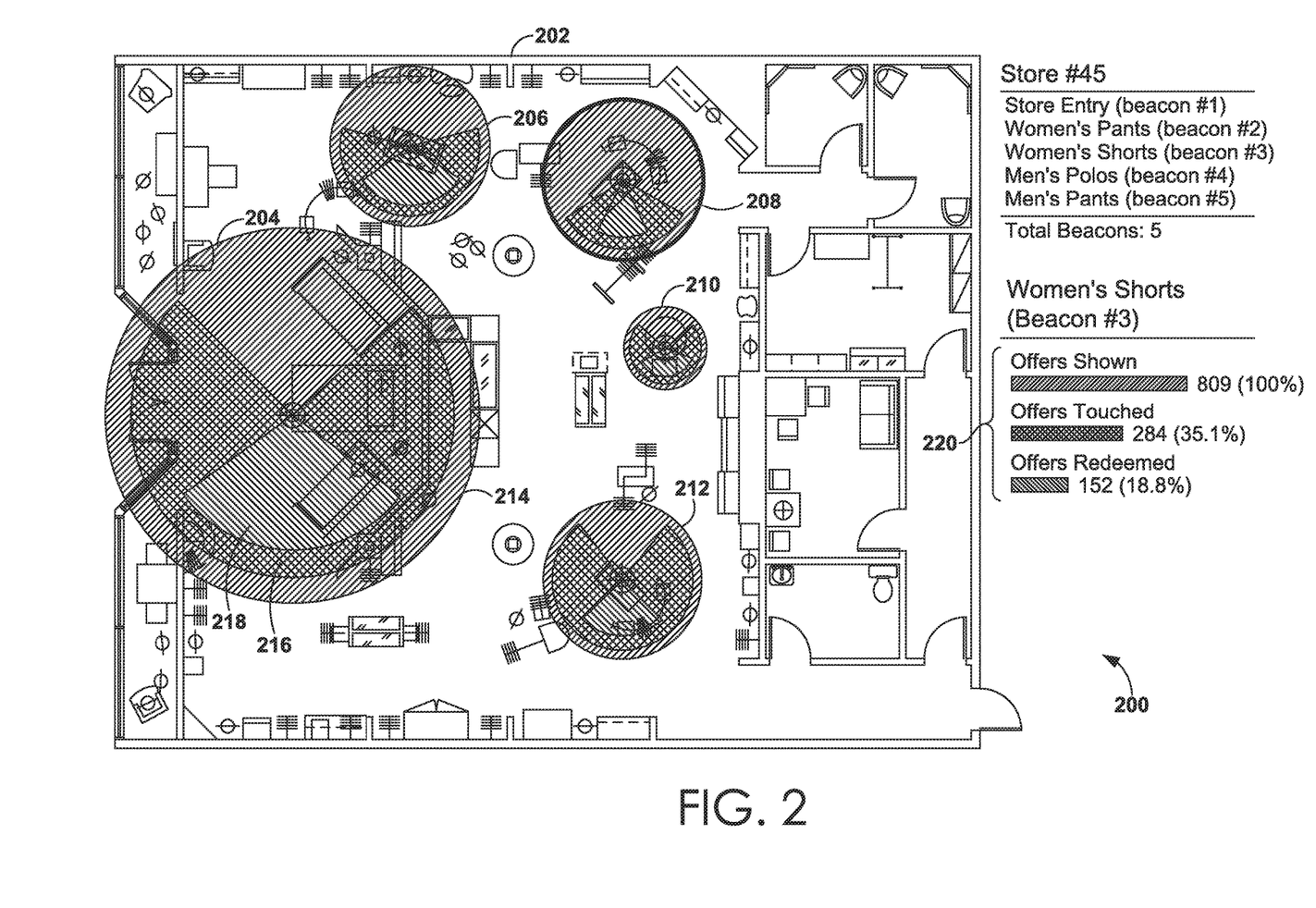
FIG. 2 illustrates an exemplary display of a spatial visualization of metrics in association with an indoor environment, in accordance with an embodiment of the present invention.

In conventional systems, data might overlay a geographical region with which the data corresponds. To this end, a heat map may be used to illustrate occupancy data of individuals within a geographical region. Oftentimes, however, multiple metrics related to a particular geographical region may be measured and/or captured. Various aspects of the technology described herein are generally directed to systems, methods, and computer-readable media for, among other things, generating and presenting a graphical user interface that allows a user to visualize multiple metrics in relation to a particular spatial area. This is useful across a broad spectrum of fields. For instance, a person in the marketing field may desire to simultaneously view multiple marketing metrics associated with a geographical region. By way of example, and with brief reference to FIG. 2, FIG. 2 illustrates a spatial map 202 in which multiple metrics (metric stack) related to a specific spatial region within the map are presented in relation thereto. For instance, metric stack 204 includes a representation of a first metric 214, a second metric 216, and a third metric 218 overlaying a spatial region. Each of the first metric 214, second metric 216, and third metric 218 represent data associated with the same spatial region. As described herein, a user can interact with one or more represented metrics within the spatial regions to view additional or more detailed information associated with the metric. Implementing embodiments of the present invention enables a user to simultaneously visualize multiple metrics related to a spatial region such that the user can efficiently identify a high-impact metric(s) and/or spatial region(s), and thereby optimize performance.

Various terms are used throughout this description. Although more details regarding various terms are provided throughout this description, general definitions of some terms are included below to provider a clearer understanding of the ideas disclosed herein:

A metric refers to any type of measurement used to indicate or gauge some quantifiable component of data. Oftentimes, a metric is related to performance, but is not intended to be limited herein. By way of example, and without limitation, a metric may be a type of measurement related to marketing, such as an offer shown, an offer touched or viewed, an offer redeemed, a conversion, etc.

Metric data may refer to any data associated with a metric. Metric data may include, for example, a metric value, a position data, etc. A metric value refers to any values used to indicate a quantifiable component of a metric. Exemplary metric values may include, for example, a number, a ratio, a percent, etc. Position data may refer to any data indicating a position or location associated with a metric or metric value. Position data may be, for instance, a geographical coordinate, an approximate location, or the like.

A metric element refers to a visual representation of a metric value associated with a metric. In this regard, a metric element presents a metric value in a visual format, such as a graphic form (e.g., a chart, plot, graph, etc.).

A metric stack refers to a stack or integrated set of metric elements. In this regard, a metric stack visually illustrates multiple metric values that represent data associated with corresponding metrics. A metric stack may be provided in a graphic format that overlays or integrates multiple metric values such that multiple metric values associated with various metrics can be simultaneously viewed. As one example, a metric stack may integrate a circular chart that visually illustrates multiple metric values corresponding with various metrics, as illustrated by metric stack 204 of FIG. 2, for instance.

A spatial map refers to a map, environment, or space that represents a space, such as an indoor space and/or outdoor space. A spatial map may be a geographical map or other representation of at least a portion of the earth illustrating features based on relative size and/or location. A spatial map can be any degree of magnitude. Generally, a spatial map is the environment, space, or map presented to a user via a display screen such that metric elements and/or metric stacks can be overlaid thereon or integrated therewith.

Figure 3:
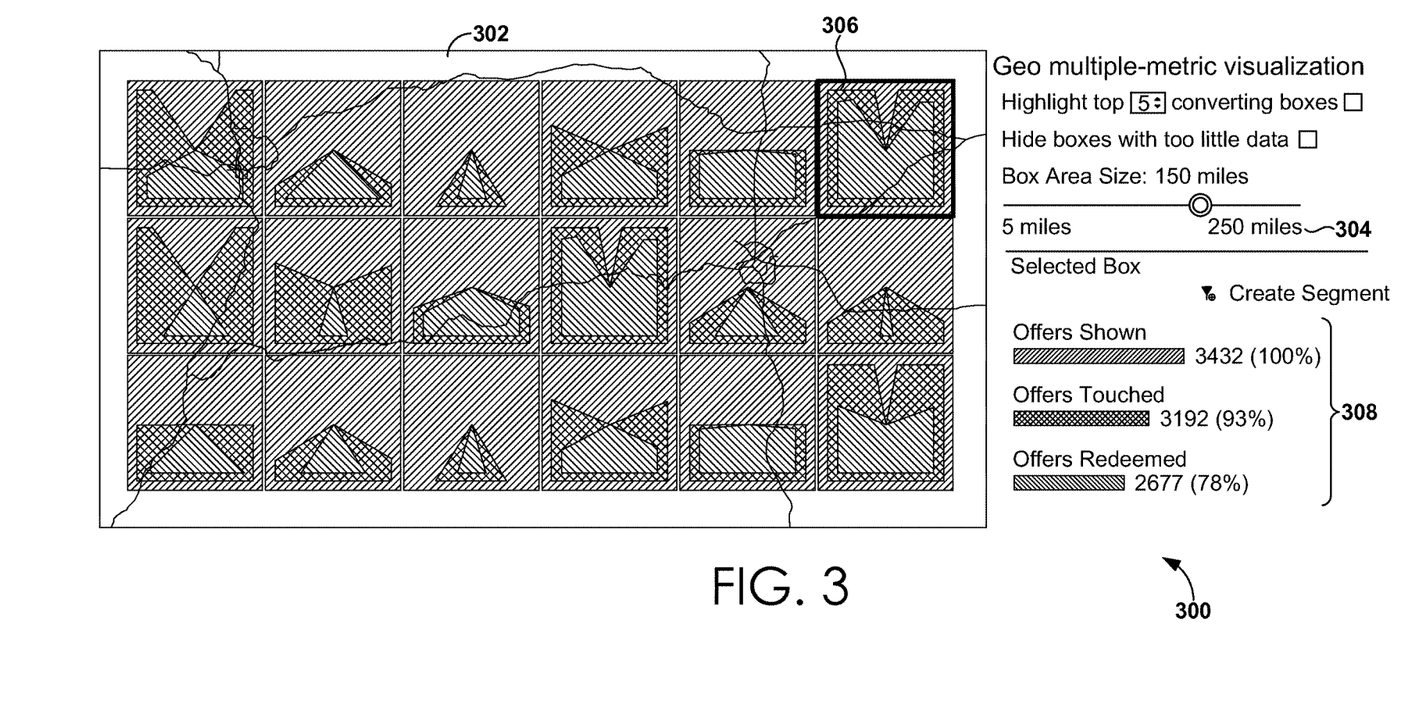
FIG. 3 illustrates an exemplary display of a spatial visualization of metrics in association with an outdoor environment using a first spatial region size, in accordance with an embodiment of the present invention.

A spatial region refers to a region or aspect within the spatial map. That is, a spatial region is a portion of a spatial map, such as a geographical map. A spatial map can have any number and shape of spatial regions. For instance, spatial regions may be circular in nature and correspond with a particular area, such as an area corresponding with a beacon, as illustrated in FIG. 2. As another example, spatial regions may be rectangular in shape making up a grid-like structure on a spatial map, as illustrated in FIG. 3.

Figure 1:
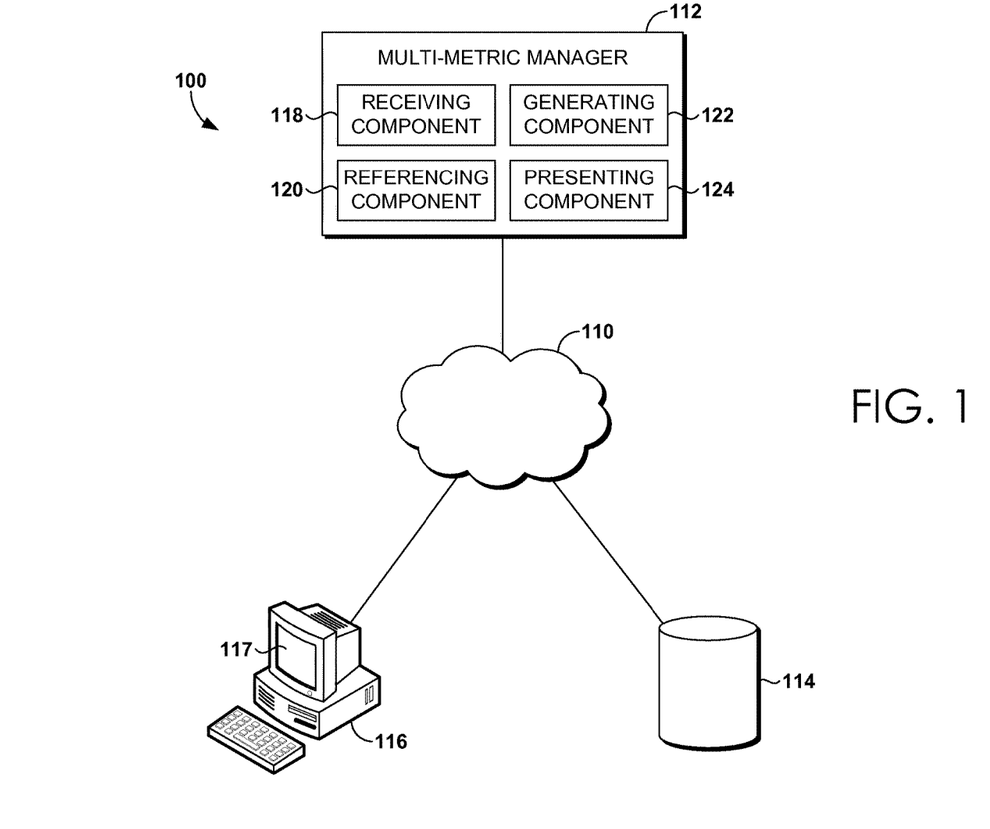
FIG. 1 is a block diagram of an exemplary system suitable for generating a spatial visualization of metrics, in accordance with an embodiment of the present invention.

Turning now to FIG. 1, a block diagram is illustrated that shows an exemplary computing system environment 100 suitable for use in implementing embodiments of the present invention. It will be understood and appreciated that the computing system environment 100 shown in FIG. 1 is merely an example of one suitable computing system environment and is not intended to suggest any limitation as to the scope of use or functionality of embodiments of the present invention. Neither should the computing system environment 100 be interpreted as having any dependency or requirement related to any single module/component or combination of modules/components illustrated therein.

The computing system environment 100 includes a multi-metric manager 112, a data store 114, and an end-user computing device 116 with a display screen 117 all in communication with one another via a network 110. The network 110 may include, without limitation, one or more local area networks (LANs) and/or wide area networks (WANs). Such networking environments are commonplace in offices, enterprise-wide computer networks, intranets and the Internet. Accordingly, the network 110 is not further described herein.

In some embodiments, one or more of the illustrated components/modules may be implemented as stand-alone applications. In other embodiments, one or more of the illustrated components/modules may be integrated directly into the operating system of the multi-metric manager 112.

The components/modules illustrated in FIG. 1 are exemplary in nature and in number and should not be construed as limiting. Any number of components/modules may be employed to achieve the desired functionality within the scope of embodiments hereof. Further, components/modules may be located on any number of servers, computing devices, or the like. By way of example only, the multi-metric manager 112 might reside on a server, cluster of servers, or a computing device remote from or integrated with one or more of the remaining components.

It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components/modules, and in any suitable combination and location. Various functions described herein as being performed by one or more entities may be carried out by hardware, firmware, and/or software. For instance, various functions may be carried out by a processor executing instructions stored in memory.

The data store 114 is configured to store information associated with a spatial map and/or one or more metrics. In various embodiments, such information pertaining to a spatial map may include, without limitation, mapping data concerning a geographical area, such as x, y, and z coordinates representing, longitude, latitude, and elevation; images; bitmaps; or the like. Information pertaining to one or more metrics may include, metric descriptions, metric values or data, position data, spatial regions associated with corresponding metric values, etc. In embodiments, the data store 114 is configured to be searchable for one or more of the items stored in association therewith. The information stored in association with the data store 114 may be configurable and may include any information relevant to spatial maps, metrics, and/or the like. The content and volume of such information are not intended to limit the scope of embodiments of the present invention in any way. Further, though illustrated as a single, independent component, the data store 114 may, in fact, be a plurality of storage devices, for instance, a database cluster, portions of which may reside on the multi-metric manager 112, end-user computing device 116, and/or any combination thereof.

As shown, the end-user computing device 116 includes a display screen 117. The display screen 117 is configured to display information to the user of the end-user computing device 116, for instance, information relevant to communications initiated by and/or received by the end-user computing device 116, information concerning metrics (e.g., marketing metrics), graphical displays of metrics, information concerning spatial maps, graphical displays of spatial maps, and/or the like. The end-user computing device 116 may be any type of device suitable for facilitating presentation of a GUI. Such computing devices may include, without limitation, a computer, such as, for example, computing device 900 described below with reference to FIG. 9. Other types of display devices may include tablet PCs, PDAs, mobile phones, smart phones, as well as conventional display devices such as televisions.

The multi-metric manager 112 shown in FIG. 1, as described more fully below, may be any type of computing device, such as, for example, computing device 900 described below with reference to FIG. 9. By way of example only and not limitation, the multi-metric manager 112 may be a personal computer, desktop computer, laptop computer, handheld device, mobile handset, consumer electronic device, a server, a cluster of servers, or the like. It should be noted, however, that embodiments are not limited to implementation on such computing devices, but may be implemented on any of a variety of different types of computing devices within the scope of embodiments hereof.

Components of the multi-metric manager 112 may include, without limitation, a processing unit, internal system memory, and a suitable system bus for coupling various system components, including one or more data stores for storing information (e.g., files and metadata associated therewith). The multi-metric manager 112 typically includes, or has access to, a variety of computer-readable media. By way of example, and not limitation, computer-readable media may include computer-storage media and communication media. The computing system environment 100 is merely exemplary. While the multi-metric manager 112 is illustrated as a single unit, one skilled in the art will appreciate that the multi-metric manager 112 is scalable. For example, the multi-metric manager 112 may in actuality include a plurality of computing devices in communication with one another. Moreover, the data store 114, or portions thereof, may be included within, for instance, the multi-metric manager 112, a third-party service as a computer-storage medium, etc. The single unit depictions are meant for clarity, not to limit the scope of embodiments in any form.

As shown in FIG. 1, the multi-metric manager 112 comprises a receiving component 118, a referencing component 120, a generating component 122, and a presenting component 124. In some embodiments, one or more of the components 118, 120, 122, and 124 may be implemented as stand-alone applications. In other embodiments, one or more of the components 118, 120, 122, and 124 may be integrated directly into the operating system of a computing device such as the computing device 900 of FIG. 9. It will be understood by those of ordinary skill in the art that the components 118, 120, 122, and 124 illustrated in FIG. 1 are exemplary in nature and in number and should not be construed as limiting. Any number of components may be employed to achieve the desired functionality within the scope of embodiments hereof.

The receiving component 118 is configured to receive (e.g., via the network 110) requests from a user (such as a marketer) for a visualization of metrics in association with a spatial map. In embodiments, such a request from a user device may be specifically initiated by a user. For instance, a user may specify to view one or more metrics associated with a particular spatial map. In other embodiments, such a request from a user device may be provided based on a user selecting to generally view data associated with marketing data or a spatial map. By way of example only, upon logging into a user's account, the user may select a tab, icon, or other indicator to view data pertaining to marketing analysis.

The receiving component 118 may also receive other user requests regarding the visual representations of metrics in relation to a spatial map, or portion thereof. For example, the user may designate a spatial map and/or metrics to view. In this regard, the user may select the spatial map or metric(s) of interest. In one embodiment, a menu (e.g., drop down menu) may be used to allow the user to configure which spatial map and/or metric(s) the user would like to be displayed. For example, a spatial map and/or metric(s) might be selected during account initialization, or thereafter, and saved such that the user views data associated with the selected spatial map and/or metrics each instance the user views the account, or a portion thereof. In another example, the spatial map and/or metric(s) might be selected each instance the user wishes to view the metrics associated with a particular spatial map.

Further, once presented, a user may interact with the spatial map and/or metrics to view additional or more detailed data. In this way, for a spatial map, a user can select to narrow or broaden the focus of area displayed. For instance, a user may zoom-in, zoom-out, or traverse a spatial map by selecting translation or rotation indicators to manipulate the display area. As another example, a user can select a visual metric element or metric stack presented in connection with a spatial map representation to view additional details in relation to that metric or a set of metrics.

The receiving component 118 may also receive requests from users to view metrics corresponding with a specified range of time. For example, the user may request that the metrics correspond with today, yesterday, the last 7 days, the last 30 days, or the last 6 months. Any and all such variations, and any combination thereof, are contemplated to be within the scope of embodiments of the present invention.

The referencing component 120 is configured to reference data associated with metrics and/or a spatial map associated therewith. Generally, a spatial map (mapping data) and/or metric data are referenced to generate a spatial visualization of metrics (e.g., metric stack in relation to a spatial region).

A spatial map, or mapping data associated therewith, can be referenced, for instance, from a data store, such as data store 114. As previously described, a spatial map refers to a map or an environment, indicating spatial relevance of features, over which a representation of a metric or set of metrics can be displayed. A spatial map may be an indoor and/or outdoor environment. An indoor environment may be, for example, a building, a store, a room, etc. An outdoor environment may be a world, a country, a state, a city, or a portion thereof, for example. An appropriate spatial map, or mapping data associated therewith, can be referenced based on a spatial map designated by a user or designated as a default spatial map. For example, upon detecting a user selection of a spatial map for a particular store, the corresponding spatial map can be referenced.

Metric data associated with metrics can also be referenced, for instance, from the data store 114, a computing device(s), or the like. As previously described, a metric refers to any type of measurement used to indicate or gauge some quantifiable component of data. Oftentimes, a metric is related to performance, but is not intended to be limited herein. By way of example, and without limitation, a metric may be a type of measurement related to marketing, such as an offer shown, an offer touched, an offer redeemed, a conversion, etc. Metric data refers to any data associated with a metric. Metric data may be a metric value, position data, or the like. A metric value refers to any value of a quantifiable component of a metric. Exemplary metric values may include, for example, a number, a ratio, a percent, etc. Position data provides an indication of a position or location associated with a metric. Exemplary position data may include a geographic coordinate or set of coordinates, a time associated with the geographic coordinate, etc.

Metric data to reference can be based on the designated spatial map. In this regard, metric data associated with the spatial map to be presented can be referenced. In some cases, all metric data associated with a spatial map can be referenced while, in other cases, a portion of metric data associated with the spatial map can be referenced. The portion of metric data to be referenced might be based on, for instance, spatial regions within the spatial map, specific metrics, a time range, etc. In some cases, metric data associated with various spatial regions within the spatial map can be referenced. The specific metric data to reference may be based on, for example, a user designation, default setting, or the like. For example, metric data associated with a set of spatial regions selected by a user or designated as default regions can be referenced. In additional or alternative cases, metric data associated with specific metrics, such as metrics selected by a user or designated as a default set of metrics, can be referenced. Further, as the metrics may be displayed in association with a particular period of time, the referencing component 120 can be configured to reference metric data associated with a particular time period (e.g., today, the last 7 days, the last 30 days, or the last 6 months).

As can be appreciated, metric data and/or mapping data to be referenced can be attained in any number of manners and is not intended to limit the scope of embodiments of the present invention. In some cases, metric data and/or mapping data may accumulate or aggregate at a server or a data store, such as data store 114, from various sources. For example, metric data indicating user interactions performed by users in association with user devices may be captured and communicated to a server to process such information. To this end, position data associated therewith, may also be captured by the user device (e.g., via a GPS) in association with capturing metric values. Such position data may be provided along with or in addition to the other data provided to the server or data store.

Metric data and/or mapping data may alternatively or additionally be provided by a web server, application server, or other component such as a beacon(s). For instance, position data may be captured and provided by other components, such as a beacon in communication with a user device (e.g., mobile device). A beacon may use Bluetooth® technology to detect and communicate with nearby user devices, for example, to improve an in-store shopping experience.

The generating component 122 is configured to generate or modify a spatial visualization of metrics. Generally, the spatial visualization of metrics provides representations of metrics overlaid or integrated with a spatial mapping at a location related to the metric. Spatial visualizations can be generated in accordance with a particular spatial map and/or metric(s), for example, as specified by a user or as set by a default setting or preference (e.g., system defined or user defined). Such representations of metrics overlaid on or integrated with a spatial map may be in the form of a metric element or a metric stack, as described more fully below.

A metric element refers to a visual representation of a metric value associated with a metric. In this regard, a metric element visually presents a metric value in a format such as a graphic form (e.g., charts, tables, plots, graphs, etc.). Metric data associated with a spatial region can be used to generate a spatial visualization of a metric element, such as a pie chart. To this end, upon referencing a metric value for a particular metric, the metric value can be used to generate a metric element that visually represents the value. In other words, the metric element is in a visual or graphical form as opposed to a textual or numerical format. The generating component 122 can then overlay or integrate the metric element with the spatial map at a position or location that corresponds with the metric value.

A metric stack refers to a stack or integrated set of metric elements. In this regard, a metric stack visually illustrates multiple metric values that represent data associated with corresponding metrics. As a result, a metric stack enables a user to visualize multiple metrics that correspond with one another. As described herein, the metric stack includes multiple visual representations of a metric overlaid or integrated with one another. Accordingly, top and/or bottom performers can visually stand out to the user without performing detailed analysis. A metric stack can be generated in any number of forms, such as a chart, table, plot, graph, various forms thereof, and the like. Any and all such variations, and any combination thereof, are contemplated to be within the scope of embodiments of the present invention. Further, metric stacks can be or include any shape, symbol, icon, or other representation.

A metric stack may be provided in a graphic format that overlays or integrates multiple metric values such that multiple metric values associated with various metrics can be simultaneously viewed in relation to a particular spatial region. As one example, a metric stack may be of a chart form (e.g., pie chart) that visually illustrates multiple metric values corresponding with various metrics, as illustrated by metric stack 204 of FIG. 2, for instance.

As can be appreciated, in one embodiment, a perimeter or area of a shape, such as a circumference of a circle, can represent a metric that represents a total number of samples or observations. One or more sectors within the shape can represent a numerical proportion(s) of a metric(s) within the total number of samples or observations. In some cases, one sector can lay within another sector within the shape. By way of example, and with reference to FIG. 2, a first sector 216 representing number of offers touched is illustrated within the circle 214 representing number of offers shown. Further, a second sector 218 that represents a number of offers redeemed can be presented within the first sector 216. In some cases, the second sector 218 can be shown proportional to the circle 214 representing the total number of offers shown or proportional to the first sector 216 representing the number of offers touched.

To generate a spatial visualization of a metric stack, such as integrated metric elements, multiple metric elements can be generated and, thereafter, combined or integrated with one another. As another example, metric values associated with multiple metrics corresponding with a spatial region may be analyzed and used to generate a metric stack. As can be appreciated, because metric data is spatially presented, the metric values used to generate a metric element and/or metric stack are associated with a particular spatial region within the spatial map. The generating component 122 can then overlay or integrate the metric element with the spatial map at a position or location that corresponds with the metric value. As such, in association with generating a metric element and/or metric stack, the generating component 122 can map or associate the metric element and/or stack with an appropriate spatial region. That is, the spatial region that is applicable or related to the various metric measurements in the metric stack can be identified.

The generating component 122 can further utilize any user selections to generate and/or modify a metric stack(s) in relation to a spatial region. That is, upon identifying a user selection to apply to a metric element(s) or stack(s) and/or spatial area(s), the generating component 122 can generate a new metric element(s) or stack(s) or modify an element or stack to display as a visual representation. For example, upon a user selecting a particular metric representation within a metric stack, the metric stack can be generated or modified to include, the specific metric values. In another example, upon a user selecting one or more spatial regions within a spatial map, the visual representation can be generated or modified to zoom-in to the selected spatial region of the spatial map.

The presenting component 124 is configured to present the spatial visualization of metrics such that a GUI can display graphical representations of metric in relation to a corresponding spatial region. That is, the presenting component 124 presents a spatial visualization of metrics, and/or data associated therewith. In one implementation, the presenting component 124 communicates or transmits data to the user device 116 for displaying a GUI that provides a spatial visualization of metrics. In some cases, the presenting component 124 may communicate the spatial visualization of metrics as a spatial map with overlaid or integrated metric representations for display (e.g., via end-user device 116). In other cases, the presenting component 124 may communicate the spatial map and the corresponding metric representations so that the displaying device, such as end-user device 116, can aggregate the spatial map with the metric elements and/or metric stacks in appropriate locations over the spatial map. In another implementation, the presenting component 124 can present a GUI providing a spatial visualization of metrics via the multi-metric manager 112.

Turning now to FIGS. 2-6, graphical user interfaces (GUIs) or displays for displaying spatial visualizations of metrics are depicted. It should be understood that the graphical user interfaces or displays described herein are exemplary only and may differ in appearance, content, or configuration in various embodiments. Further, various selection portions can be used to navigate the display and those described herein are not meant to limit the scope of embodiments of the present invention. For instance, a user may interact with a button, a pull-down menu, a check box, a link (e.g., hypertext link), a click box, etc. to select, navigate, access, display, or the like. The displays can be accessed or navigated using any known input device. By way of example only, a keyboard, computer mouse, stylus, finger, voice, or any other selection component can be used to navigate or input data.

Initially, with reference to FIG. 2, FIG. 2, referenced generally by the numeral 200, illustrates metric stacks displayed in relation to a corresponding spatial region. As depicted in FIG. 2, a user can select to view data associated with marketing metrics associated with Store #45. As can be appreciated, any number or format of icons can be selected to view various spatial maps. For example, in some cases, when a user clicks on a store, one or more corresponding metric stacks will be automatically presented.

As illustrated in FIG. 2, upon selecting to view data associated with metrics related to store #45, a spatial map displaying area 202 can be displayed that displays one or more metric stacks corresponding with spatial regions of the map 202. In FIG. 2, the spatial map displaying area 202 provides five metric stacks, each representing multiple different metrics. In this exemplary embodiment, the metric stacks are circular metric stacks having metrics measurements represented via a circular chart. Each of metric stacks 204, 206, 208, 210, and 212 visually represent three separate metrics including "offers shown," "offers touched," and "offers redeemed." As such, a user can view the various metric stacks and quickly recognize which areas of the store are proportionally optimizing the offers redeemed. The metric stacks may be transparent such that the user can maintain a view of the underlying spatial map. The varying diameter of the circles can represent the set proximity trigger of a particular beacon. Such proximity triggers can range from less than 1.5 meters to greater than twenty meters.

Assume that a user selects a particular metric, namely, metric stack 208. In such a case, the corresponding metric data can be provided, for example, in area 220. In this example, the selected reporting beacon area where beacon 3 is located shows 809 offers, which represents 100% of offers shown for that area. Of the 809 offers shown, there were 284 (35.1%) offers touched and 152 (18.8%) offers redeemed. These two metrics can be represented using different colors, shades, etc. with the equivalent percentages shown within the concentric pie graphs. Although FIG. 2 illustrates five metric stacks, any number of metric stacks can be displayed in the environment displaying area 202. Further, the number of metrics represented within each metric stack can also vary and is not limited to three metrics.

Turning to FIG. 3, FIG. 3 referenced generally by the numeral 300 illustrates metric stacks displayed in relation to a corresponding spatial region. As depicted in FIG. 3, a user can select to view data associated with marketing metrics associated with a geographical map. As can be appreciated, any number or format of icons can be selected to view any of various spatial maps. For example, in some cases, when a user clicks on a geographical map, one or more corresponding metric stacks will be automatically presented.

As illustrated in FIG. 3, upon selecting to view data associated with metrics related to geographical map 302, the geographical map 302 can be displayed that displays one or more metric stacks corresponding with spatial regions of the map 302. In FIG. 3, the geographical map 302 provides metric stacks that have a "box area size" of 150 miles. Such a metric stack size can be predetermined or selected by the user in any manner, such as a sliding scale 304. In this exemplary embodiment, the metric stacks are box metric stacks having metrics measurements represented therein. Each of the metric stacks visually represent three separate metrics including "offers shown," "offers touched," and "offers redeemed." As such, a user can view the various metric stacks and quickly recognize which areas of the geographical map are proportionally optimizing the offers redeemed.

Assume that a user selects a particular metric stack, namely, metric stack 306. In such a case, the corresponding metric data can be provided, for example, in area 308. In this example, the selected metric stack 306 shows 3432 offers, which represents 100% of offers shown for that region. Of the 3432 offers shown, there were 3192 (93%) offers touched and 2677 (78%) offers redeemed. The metrics can be represented as different colors or shades to visually represent the percentage or numeral associated with such metrics. Although FIG. 3 illustrates each metric stack as representing three different metrics, any number of metrics can be visually represented and is not limited to three metrics.

Figure 4:
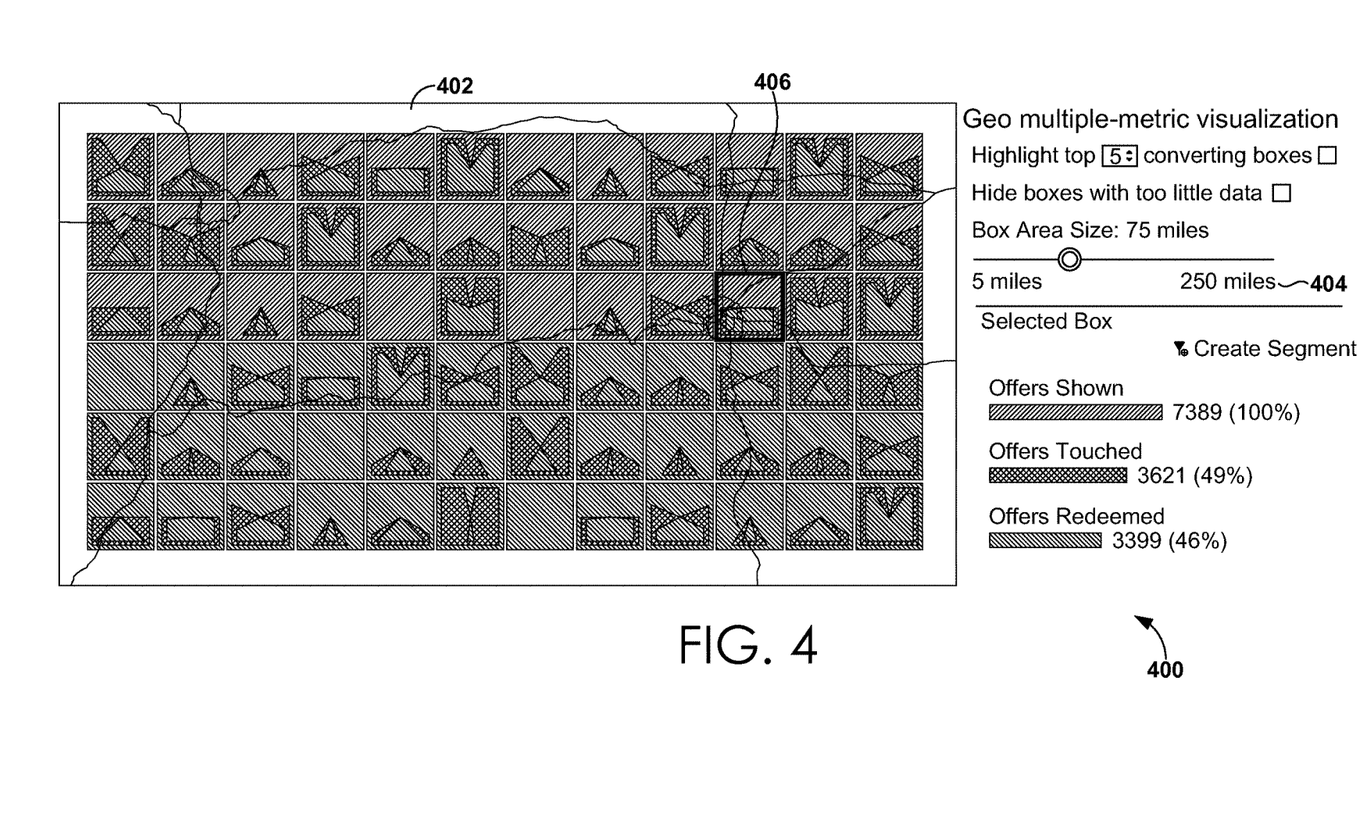
FIG. 4 illustrates an exemplary display of a spatial visualization of metrics in association with an outdoor environment using a second spatial region size, in accordance with an embodiment of the present invention.

FIG. 4 illustrates another exemplary spatial visualization of metrics. FIG. 4 referenced generally by the numeral 400 illustrates metric stacks displayed in relation to a corresponding spatial region. As illustrated in FIG. 4, upon selecting to view data associated with metrics related to geographical map 402, the geographical map 402 can be displayed that displays one or more metric stacks corresponding with spatial regions of the map 402. The geographical map 402 provides metric stacks that have a "box area size" of 75 miles. Such a metric stack size can be predetermined or selected by the user in any manner, such as a sliding scale 404. In this exemplary embodiment, the metric stacks are box metric stacks having metrics measurements represented therein. Each of the metric stacks visually represent three separate metrics including "offers shown," "offers touched," and "offers redeemed." As such, a user can view the various metric stacks and quickly recognize which areas of the geographical map are proportionally optimizing the offers redeemed.

Further, as illustrated in FIG. 4, a user may select to "create segment." Generally, a segment refers to the ability to examine or filter a subset of data based on a specific criteria (e.g., show only data for users using a particular type or brand of device). By selecting to "create segment," reports can be filtered based on one or more selected regions. For example, assume geographical region 406 of FIG. 4 is selected by a user followed by a user selection to "create segment." In such a case, a report or data generated or shown thereafter contains activity of users located within that selected region or area. Additionally or alternatively, a targeted marketing campaign may be carried out for individuals located within the selected geographical region 406.

Figure 5:
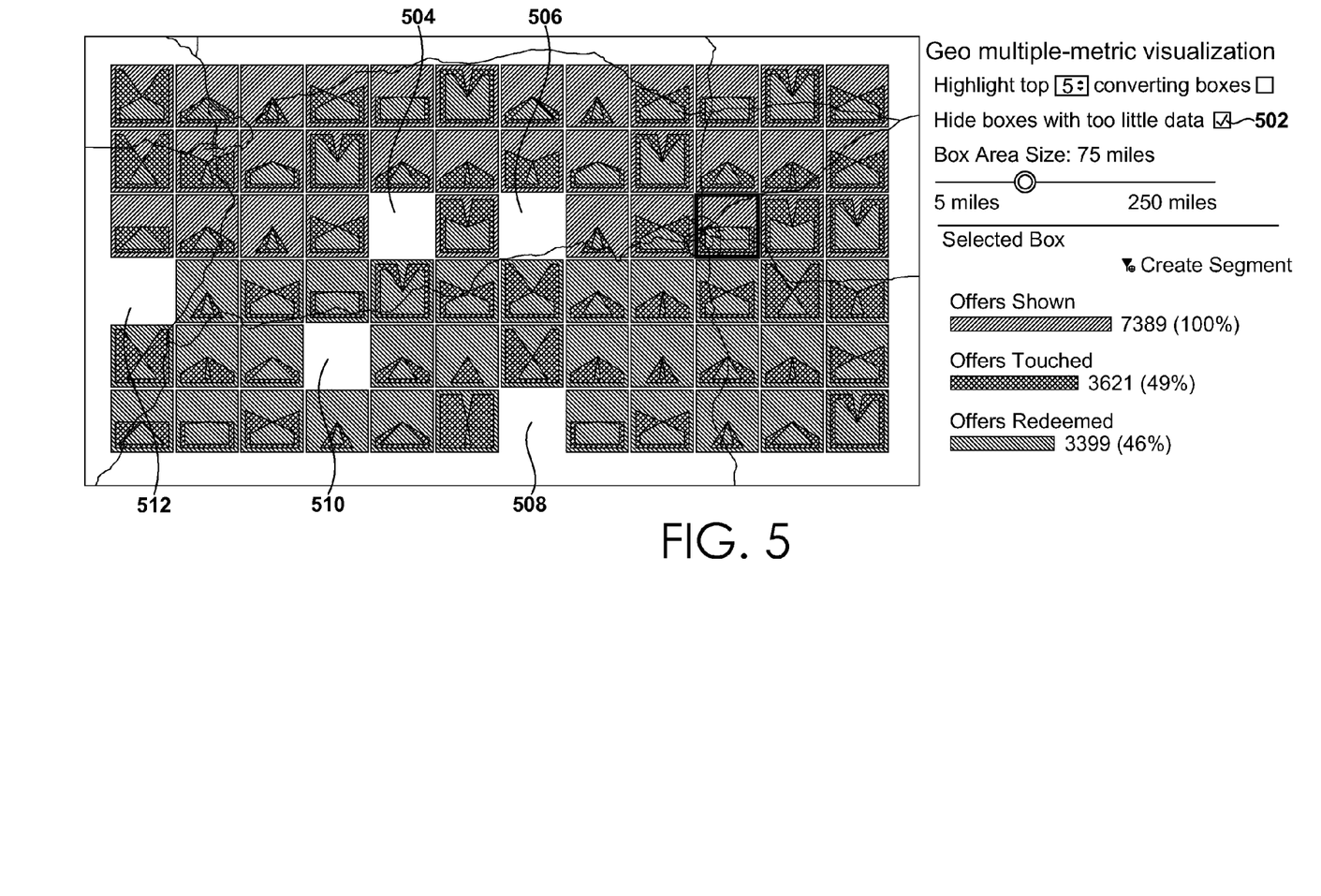
FIG. 5 illustrates an exemplary display of a spatial visualization of metrics with regions having a lack of data removed, according to embodiments of the present invention.

Continuing with reference to FIG. 5, assume now that a user selects to "hide boxes with too little data" via checkbox 502. Upon selection of checkbox 502, the spatial regions having no data or irrelevant data, for example, based on a predetermined threshold, can be removed from the display. For instance, spatial regions 504, 506, 508, 510, and 512 have been removed from the spatial map. Although FIG. 5 illustrates the regions as removed, as can be appreciated, any number of formats may be applied to indicate such regions. For instance, the regions may be highlighted in a particular color, shade, etc.

Figure 6:
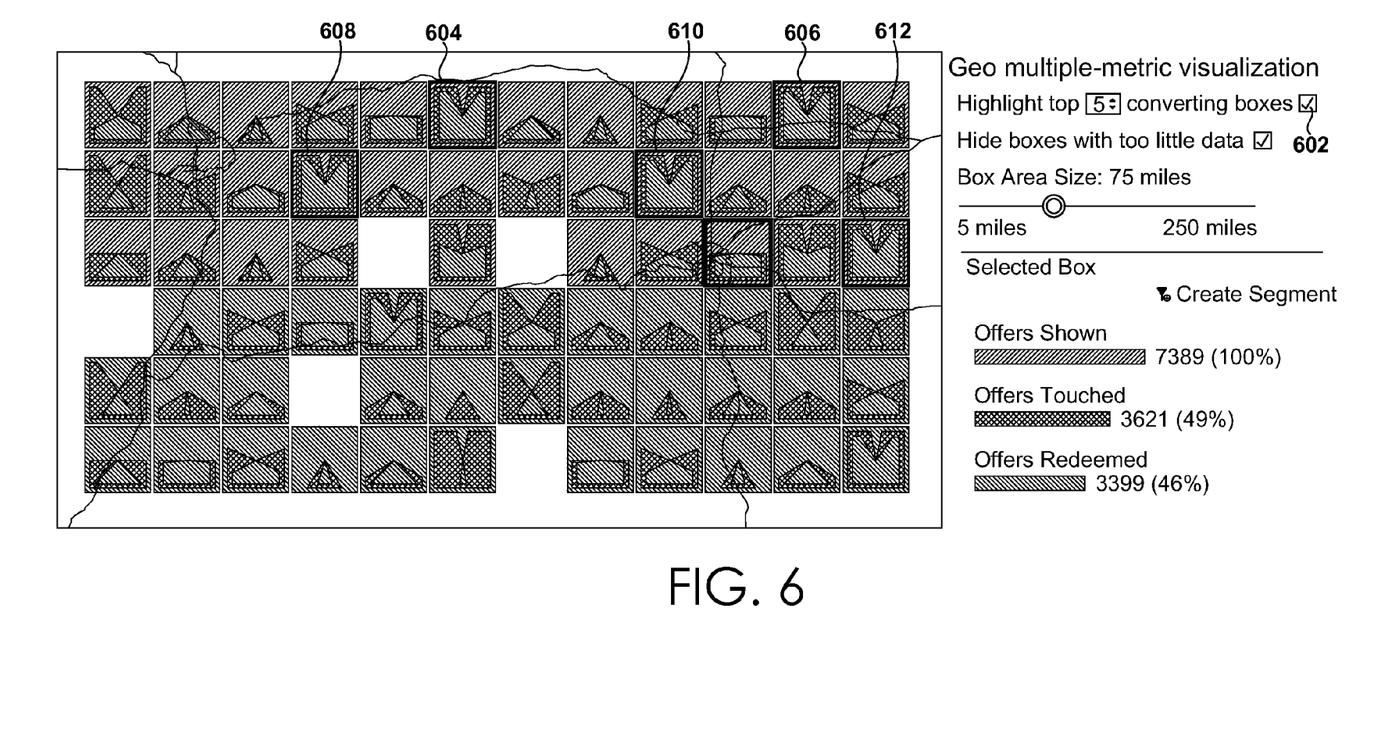
FIG. 6 illustrates an exemplary display of spatial regions highlighted that correspond with the greatest conversions, in accordance with an embodiment of the present invention.

Now assume that a user selects the "highlight top 5 converting boxes" checkbox 602 of FIG. 6. Upon selection of checkbox 602, the top 5 spatial regions that have the greatest or highest conversion are highlighted, as illustrated at spatial regions 604, 606, 608, 610, and 612. In FIG. 6, the regions with the highest conversions are the spatial regions that have the highest percentage for "offers redeemed." As can be appreciated, any metric being a "largest" or "smallest" can be highlighted or otherwise visually distinguished. Further, as shown in FIG. 6, the quantity to be visually distinguished can be user selected.

Figure 7:
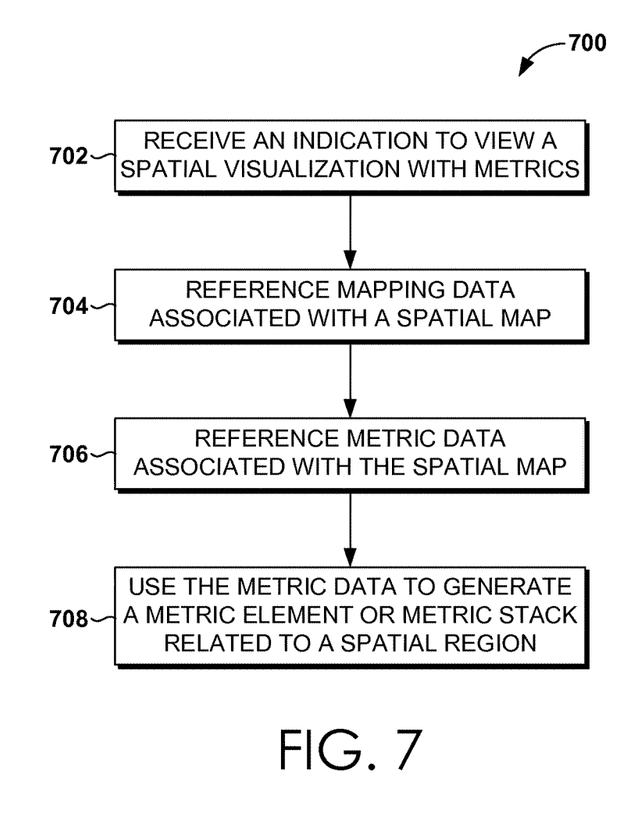
FIG. 7 is a flow diagram illustrating a method for providing a spatial visualization of metrics, in accordance with an embodiment of the present invention.

To recapitulate, embodiments of the invention include systems, machines, media, methods, techniques, processes and options for generating and providing spatial visualizations of metrics. Turning to FIG. 7, a flow diagram is illustrated that shows an exemplary method 700 for providing a spatial visualization of metrics, according to embodiments of the present invention. The method 700 might be performed, for example, by multi-metric manager 112 in FIG. 1. In some embodiments, aspects of embodiments of the illustrative method 700 can be stored on computer-readable media as computer-executable instructions, which are executed by a process in a computing device, thereby causing the computing device to implement aspects of the method 700. The same is, of course true, with the illustrative method 800 depicted in FIG. 8, or any other embodiment, variation, or combination of these methods.

Initially, as indicated at block 702, an indication to view a spatial visualization of metrics is received. Such an indication might be detected based on a user indication within an application (e.g., web application or stand-alone application). Thereafter, at block 704, mapping data associated with a spatial map is referenced. The mapping data may include the spatial map or data associated therewith. In embodiments, the mapping data to reference might be based on a user indication of a spatial map or a predetermined preference or default (e.g., user preference or system preference). At block 706, metric data associated with the spatial map is referenced. Such metric data may be selected based on a selected spatial map, a selected metric, and/or the like. In some embodiments, metric data associated with each spatial region within the spatial map are referenced. Position data corresponding with a metric can be used to determine a spatial region associated with the metric. For example, position data captured via a GPS or beacon may be used to identify a spatial region related to a metric captured in accordance such a position or location.

At block 708, the metric data is used to generate a metric element or metric stack related to a spatial region. The metric element and/or stack is overlaid or integrated with the corresponding spatial region in the spatial map to generate a spatial visualization of metrics. Such a spatial visualization of metrics can be provided via a display screen to a user so that the user can effectively visualize the metrics as they relate to a specific region or set of regions.

Figure 8:
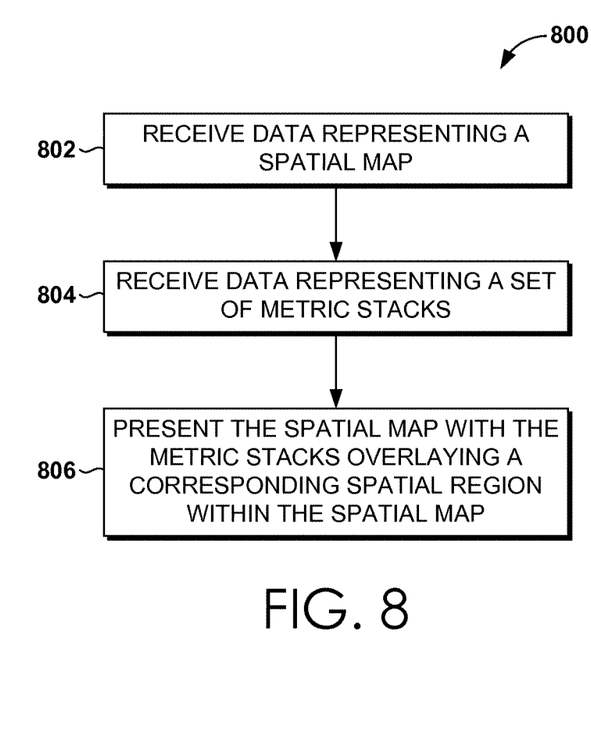
FIG. 8 is a flow diagram illustrating another method for providing a spatial visualization of metrics, in accordance with an embodiment of the present invention.

With reference now to FIG. 8, a flow diagram is illustrated that shows an exemplary method 800 for presenting a spatial visualization of metrics, according to embodiments of the present invention. The method 800 might be performed, for example, by end-user computing device 116 in FIG. 1. Initially, as indicated at block 802, data representing a spatial map are received. At block 804, data representing a set of metric stacks are received. At block 806, the spatial map is presented with metric stacks being overlaid over the spatial map in accordance with the corresponding spatial region within the spatial map related to the metric stack.

Having described an overview of embodiments of the present invention, an exemplary operating environment in which embodiments of the present invention may be implemented is described below in order to provide a general context for various aspects of the present invention. Referring initially to FIG. 9 in particular, an exemplary operating environment for implementing embodiments of the present invention is shown and designated generally as computing device 900. Computing device 900 is but one example of a suitable computing environment and is not intended to suggest any limitation as to the scope of use or functionality of the invention. Neither should the computing device 900 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

Figure 9:
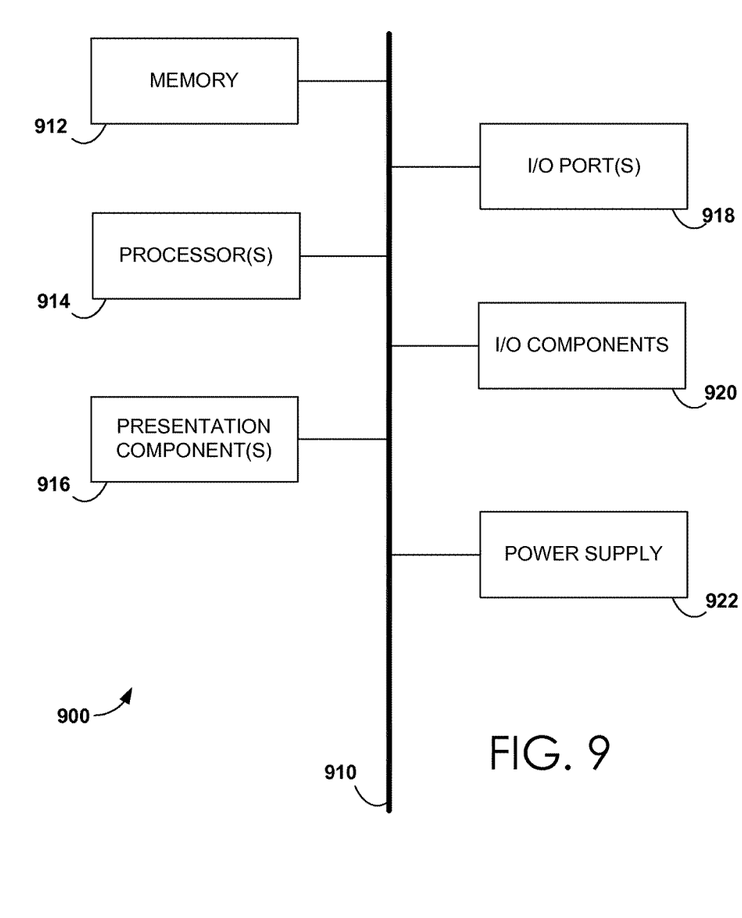
FIG. 9 is a block diagram of an exemplary computing environment suitable for use in implementing embodiments of the present invention.

With reference to FIG. 9, computing device 900 includes a bus 910 that directly or indirectly couples the following devices: memory 912, one or more processors 914, one or more presentation components 916, input/output (I/O) ports 918, input/output components 920, and an illustrative power supply 922. Bus 910 represents what may be one or more busses (such as an address bus, data bus, or combination thereof). Although the various blocks of FIG. 9 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventor recognizes that such is the nature of the art, and reiterates that the diagram of FIG. 9 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 9 and reference to "computing device."

Computing device 900 typically includes a variety of computer-readable media. Computer-readable media can be any available media that can be accessed by computing device 900 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 900. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 912 includes computer-storage media in the form of volatile and/or nonvolatile memory. The memory may be removable, non-removable, or a combination thereof. Exemplary hardware devices include solid-state memory, hard drives, optical-disc drives, etc. Computing device 900 includes one or more processors that read data from various entities such as memory 912 or I/O components 920. Presentation component(s) 916 present data indications to a user or other device. Exemplary presentation components include a display device, speaker, printing component, vibrating component, etc.

I/O ports 918 allow computing device 900 to be logically coupled to other devices including I/O components 920, some of which may be built in. Illustrative components include a microphone, joystick, game pad, satellite dish, scanner, printer, wireless device, etc. The I/O components 920 may provide a natural user interface (NUI) that processes air gestures, voice, or other physiological inputs generated by a user. In some instance, inputs may be transmitted to an appropriate network element for further processing. A NUI may implement any combination of speech recognition, touch and stylus recognition, facial recognition, biometric recognition, gesture recognition both on screen and adjacent to the screen, air gestures, head and eye tracking, and touch recognition associated with displays on the computing device 900. The computing device 900 may be equipped with depth cameras, such as, stereoscopic camera systems, infrared camera systems, RGB camera systems, and combinations of these for gesture detection and recognition. Additionally, the computing device 900 may be equipped with accelerometers or gyroscopes that enable detection of motion. The output of the accelerometers or gyroscopes may be provided to the display of the computing device 900 to render immersive augmented reality or virtual reality.

As can be understood, embodiments of the present invention provide for, among other things, spatial visualization of metrics. The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. One or more computer storage media storing computer-useable instructions, that when used by a computing device, cause the computing device to perform operations comprising:
  based on user input indicating a first spatial region size, dividing a spatial map into a first plurality of spatial regions, each of the first plurality of spatial regions comprising the first spatial region size;
  accessing, for each of the first plurality of spatial regions, metric data comprising a value for a first metric and a value for a second metric, the first metric comprising a measurement of a first type of data and the second metric comprising a measurement of a second type of data, wherein the first type of data is different from the second type of data;
  generating, for each of the first plurality of spatial regions, a metric stack comprising a first metric element overlaid on a second metric element, the first metric element comprising a first two-dimensional graphical element that provides a visual representation of the value for the first metric associated with a respective spatial region of the first plurality of spatial regions and the second metric element comprising a second two-dimensional graphical element that provides a visual representation of the value for the second metric associated with the respective spatial region of the first plurality of spatial regions;
  providing for display a spatial map display area having the spatial map showing the first plurality of spatial regions, each of the first plurality of spatial regions being overlaid with the metric stack that corresponds to the respective spatial region of the first plurality of spatial regions;
  receiving a user input indicating a second spatial region size, and in response, dividing the spatial map into a second plurality of spatial regions, each of the second plurality of spatial regions comprising the second spatial region size, wherein the second spatial region size is smaller than the first spatial region size and the second plurality of spatial regions is greater in number than the first plurality of spatial regions;

accessing, for each of the second plurality of spatial regions, metric data comprising a new value for the first metric and a new value for the second metric associated with a respective spatial region of the second plurality of spatial regions;

generating a new metric stack for each of the second plurality of spatial regions based on the new value for the first metric and the new value for the second metric; and updating the spatial map to show, for each of the second plurality of spatial regions, the new metric stack corresponding to the respective spatial region of the second plurality of spatial regions.

2. The one or more computer storage media of claim 1, wherein the spatial map is a geographical map.

3. The one or more computer storage media of claim 1, wherein the spatial map is an indoor map.

4. The one or more computer storage media of claim 1, wherein each of the first plurality of spatial regions corresponds with a beacon operating in an environment represented by the spatial map.

5. The one or more computer storage media of claim 4, wherein a size of the metric stack is based on a proximity trigger of the corresponding beacon.

6. The one or more computer storage media of claim 1, wherein the first spatial region size corresponds with a user-selected spatial map area.

7. The one or more computer storage media of claim 1, further comprising a control area configured to allow a user to select a metric or a set of metrics desired for representation via the spatial visualization of metrics.

8. The media of claim 1, wherein the operations further comprise:
receiving a user selection of a first metric stack from the spatial map display area; and
displaying information regarding values for metrics associated with the first metric stack in a display area adjacent to the spatial map display area.

9. The one or more computer storage media of claim 1, wherein the operations further comprise, in response to a user command, hiding boxes corresponding to spatial regions:
determining that metric data associated with a subset of the first plurality of spatial regions fails to satisfy a predetermined threshold, the predetermined threshold corresponding to a minimum amount of metric data; and
hiding the subset of the first plurality of spatial regions from the spatial map.

10. A computerized method, the method comprising:
receiving an indication to display a set of metric stacks in relation to a map;
referencing metric data associated with a first plurality of regions of the map, each of the first plurality of regions comprising a first size, the metric data associated with the first plurality of regions comprising a value for a first metric and a value for a second metric associated with a corresponding region of the first plurality of regions, the first metric comprising a measurement of a first type of data and the second metric comprising a measurement of a second type of data, wherein the first type of data is different from the second type of data;
using the metric data to generate a metric stack for each region of the first plurality of regions, wherein each metric stack comprises a first metric element overlaid on a second metric element, the first metric element comprising a first two-dimensional graphical element that provides a visual representation of the value for the first metric associated with the corresponding region of the first plurality of regions and the second metric element comprising a second two-dimensional graphical element that provides a visual representation of the value for the second metric associated with the corresponding region of the first plurality of regions;
providing the map for display with each metric stack located on the map at the corresponding region of the map;
receiving a user input corresponding to a command to decrease the first size to a second size;
in response to the user input, referencing metric data associated with a second plurality of regions of the map, each of the second plurality of regions comprising the second size, the metric data associated with the second plurality of regions comprising a new value for the first metric and a new value for the second metric associated with a corresponding region of the second plurality of regions;
generating a new metric stack for each region of the second plurality of regions based on the new value for the first metric and the new value for the second metric; and
updating the map to show, for each of the second plurality of regions, the new metric stack positioned at the corresponding region of the second plurality of regions.

11. The method of claim 10, further comprising:
receiving a user selection of at least two metrics of interest to a user, the at least two metrics comprising measurements of two different types of performance data; and
in response to the user selection, providing for display a metric stack associated with the at least two metrics, wherein the metric stack provides a visual representation of each of the two different types of performance data concurrently.

12. The method of claim 10, wherein metric data referenced is based on a set of predefined metrics.

13. The method of claim 10, wherein the first metric element and the second metric element are overlaid on the map, and wherein the metric stack is transparent such that an underlying region of the map is visible.

14. The method of claim 10, wherein each of the first plurality of regions is a circular shape in accordance with a beacon signal provided by a beacon, and wherein a diameter of the circular shape represents a proximity trigger of the beacon.

15. A system comprising:
one or more processors; and
one or more computer storage media storing computer-executable instructions that, when executed by the one or more processors, implement a method comprising:
based on user input indicating a first spatial region size, dividing a spatial map into a first plurality of spatial regions, each of the first plurality of spatial regions comprising the first spatial region size;
accessing, for each of the first plurality of spatial regions, metric data comprising a value for a first metric and a value for a second metric, the first metric comprising a measurement of a first type of data and the second metric comprising a measurement of a second type of data, wherein the first type of data is different from the second type of data;
generating, for each of the first plurality of spatial regions, a metric stack comprising a first metric element overlaid on a second metric element, the first metric element comprising a first two-dimensional graphical element that provides a visual representation of the value for the first metric associated with a respective spatial region of the first plurality of spatial regions and the second metric element comprising a second two-dimensional graphical element that provides a visual representation of the value for the second metric associated with the respective spatial region of the first plurality of spatial regions;

providing for display a spatial map display area having the spatial map showing the first plurality of spatial regions, each of the first plurality of spatial regions being overlaid with the metric stack that corresponds to the respective spatial region of the first plurality of spatial regions;

receiving a user input indicating a second spatial region size, and in response, dividing the spatial map into a second plurality of spatial regions, each of the second plurality of spatial regions comprising the second spatial region size, wherein the second spatial region size is different from than the first spatial region size;

accessing, for each of the second plurality of spatial regions, metric data comprising a new value for the first metric and a new value for the second metric associated with a respective spatial region of the second plurality of spatial regions;

generating a new metric stack for each of the second plurality of spatial regions based on the new value for the first metric and the new value for the second metric; and updating the spatial map to show, for each of the second plurality of spatial regions, the new metric stack corresponding to the respective spatial region of the second plurality of spatial regions.

16. The system of claim 15, wherein the first metric element comprises a first shape that represents the first metric, the first metric corresponding to a number of offers shown, and the second metric element comprises a second shape that represents the second metric, the second metric corresponding to a number of offers touched, wherein the second shape is positioned within the first shape.

17. The system of claim 16, wherein the metric stack further comprises a third shape that represents a third metric, the third metric corresponding to a number of offers redeemed, wherein the third shape is positioned within the second shape.

18. The system of claim 15, wherein the first metric element comprises a first shape associated with the first metric, wherein the first metric indicates a number of samples analyzed.

19. The system of claim 18, wherein the second metric element comprises a second shape associated with the second metric, the second metric corresponding to a subset of the number of samples analyzed, the second shape positioned within the first shape.

20. The system of claim 19, wherein the metric stack further comprises a third shape associated with a third metric, the third shape positioned within the second shape and indicating a numeric value of the third metric.

* * * * *